(12) United States Patent
Kim et al.

(10) Patent No.: US 7,091,447 B2
(45) Date of Patent: Aug. 15, 2006

(54) LOCAL HEATSINK WELDING DEVICE AND WELDING METHOD THEREOF

(75) Inventors: Jong Sung Kim, Seoul (KR); Tae Eun Jin, Seongnam (KR)

(73) Assignee: Korea Power Engineering Company, Inc., Yongin (KR)

( * ) Notice: Subject to any disclaimer, the term of this patent is extended or adjusted under 35 U.S.C. 154(b) by 118 days.

(21) Appl. No.: 10/838,304

(22) Filed: May 5, 2004

(65) Prior Publication Data
US 2004/0222198 A1    Nov. 11, 2004

(30) Foreign Application Priority Data
May 10, 2003   (KR) ...................... 10-2003-0029617

(51) Int. Cl.
*B23K 9/00* (2006.01)
(52) U.S. Cl. ................... 219/136; 219/137 R
(58) Field of Classification Search ............ 219/76.11, 219/137 R, 136, 137.62; 228/46
See application file for complete search history.

(56) References Cited

U.S. PATENT DOCUMENTS 3,564,197 A * 2/1971 Bohlen ................. 219/137 R

FOREIGN PATENT DOCUMENTS

JP          56-53881    *  5/1981
KR      00261664 B1       4/2000

* cited by examiner

*Primary Examiner*—Len Tran
(74) *Attorney, Agent, or Firm*—Nixon & Vanderhye

(57) ABSTRACT

Provided is a local heatsink welding device and a method of welding using the same. The local heatsink welding device includes a welding torch disposed above welds of two pieces of a base metal placed in contact with each other to be welded, the welding torch welding the pieces of the base metal by melting a welding wire on the welds of the base material and fusing the pieces together; and a cooling unit disposed to be able to spray a low-temperature fluid from the sides of the welding torch, the cooling unit cooling at least a portion of a heat-affected zone formed around the outside of a fusion zone in which the base material is molten during welding. The local heatsink welding device can improve mechanical properties such as mechanical strength and fracture toughness of welds such as a pressure vessel for a power plant by suppressing the formation of carbide coarsening on a non-transformation heat-affected zone during welding, without adding a new heat treatment process to the production of steel for the pressure vessel.

5 Claims, 3 Drawing Sheets

LOCAL HEATSINK WELDING DEVICE AND WELDING METHOD THEREOF

BACKGROUND OF THE INVENTION

This application claims the priority of Korean Patent Application No. 2003-29617, filed on May 10, 2003, in the Korean Intellectual Property Office, the disclosure of which is incorporated herein in its entirety by reference.

1. Field of the Invention

The present invention relates to a local heatsink welding device and a method of welding using the same, and more particularly, to a local heatsink welding device and a method of welding using the same for improving mechanical properties of a welded part of a material.

2. Description of the Related Art

A pressure vessel for a nuclear power plant, which should be used for more than 40 years under high pressure, at high temperature, and in an atmosphere of neutron radiation, must have a high resistance to neutron irradiation embrittlement, high fracture toughness and fatigue strength, high degree of homogeneity, low susceptibility to induced radiation, low corrodibility, and good weldability, etc. In particular, in a core region of the pressure vessel, radiation of high-energy neutrons during operation causes reduction of a maximum absorption energy, and neutron radiation embrittlement increases a ductile-brittle transition temperature, thereby limiting operating conditions and a lifespan of the pressure vessel. Accordingly, to mitigate the operating conditions and extend the lifetime, it is preferable that the pressure vessel is made of a material having a high impact resistance (high fracture toughness).

Therefore, the pressure vessel for a nuclear power plant is manufactured based on a chemical composition specified in the ASME SA508 Gr. 3. SA508 Gr. 3 steel is also widely used for steam generators, pressurizers, and reactor coolant piping of nuclear power plants.

However, even if the pressure vessel is made of low alloy steel such as SA508 Gr.3 steel having the chemical composition specified in the ASME SA508 Gr.3, some of the above-mentioned requirements on the characteristics of the pressure vessel cannot be met. When manufacturing a pressure vessel with the low alloy steel, a welding process is essential. In the welding process, a local weak point at which mechanical strength and fracture toughness are degraded is generated by formation of carbide coarsening in a non-transformation heat-affected zone due to repeated heat input during multi-layer welding and postweld heat treatment. When manufacturing the pressure vessel of a nuclear power plant made of the SA508 Gr. 3 steel by a conventional method and apparatus for welding, some requirements on the mechanical/fracture properties of the pressure vessel cannot be met due to the carbide coarsening in the non-transformation heat-affected zone.

To solve this problem, a method of manufacturing a tougher SA508 Gr. 3 steel that has a remarkably improved fracture toughness is disclosed in Korean Patent Application No. 261664. The method includes performing an additional heat treatment in a temperature region at which a ferrite phase and an austenite phase coexist, between conventional heat treatment processes, i.e., quenching and tempering processes. The method enables manufacture of SA508 Gr. 3 low alloy steel having a remarkably increased room temperature impact resistance and maximum absorption energy and remarkably improved fracture toughness due to a lower ductile-brittle transition temperature, when compared to the SA508 Gr. 3 low alloy steel manufactured by conventional heat treatment. By manufacturing the pressure vessel for a power plant with the improved SA508 Gr. 3, the degradation of mechanical properties such as mechanical strength and fracture toughness resulting from a local brittle zone created during welding can be indirectly solved.

However, manufacturing a pressure vessel for a nuclear power plant using the improved SA508 Gr. 3 low alloy steel costs more and takes a longer time because of the added new heat treatment process required to make the improved low alloy steel, which is not conducive to progress in the power plant industry.

SUMMARY OF THE INVENTION

The present invention provides a local heatsink welding device and a method of welding that can improve mechanical properties such as mechanical strength and fracture toughness of welds such as a pressure vessel for a power plant by suppressing the formation of the carbide coarsening on a non-transformation heat-affected zone, without adding a new heat treatment process to the production of steel for the pressure vessel.

According to an aspect of the present invention, there is provided a local heatsink welding device for improving mechanical properties of welds of a base metal, comprising: a welding torch disposed above welds of two pieces of the base metal placed in contact with each other to be welded, the welding torch welding the pieces of the base metal by melting a welding wire on the welds of the base metal and fusing the pieces together; and a cooling unit disposed to be able to spray a low-temperature fluid from the sides of the welding torch, the cooling unit cooling at least a portion of a heat-affected zone formed around the outside of a fusion zone in which the base metal is molten during welding.

The heat-affected zone may be a non-transformation heat-affected zone.

The cooling unit may comprise: a pair of spray nozzles disposed at both sides of the welding torch to be able to move up and down, the spray nozzles spraying the low-temperature fluid onto the heat-affected zone; a fluid supply unit that supplies the low-temperature fluid to the spray nozzles; and a pair of fluid supply hoses connected between the spray nozzles and the fluid supply unit, the fluid supply hoses forming the flow path through which the fluid from the fluid supply unit moves to the spray nozzles.

The cooling unit may further comprise a spray nozzle control device that controls locations of the spray nozzles up and down and left and right with respect to the base metal.

A shielding curtain may be disposed between each of the spray nozzles and the welding torch to prevent the low-temperature fluid from flowing to the fusion zone from the heat-affected zone.

According to another aspect of the present invention, there is provided a method of welding a local heatsink welding device for improving mechanical properties of welds of a base metal, comprising: positioning two pieces of predetermined base metal in contact with each other to be able to be welded; welding the pieces of the base metal parts together by melting a welding wire on welds of the base metal and fusing the pieces together; and cooling at least a portion of a heat-affected zone formed around a fusion zone in which the base metal is molten, during welding, based on predetermined standard data regarding the welding of the base metal.

The heat-affected zone may be a non-transformation heat-affected zone.

The standard data may include a time taken to reach a maximum temperature of the non-transformation heat-affected zone, and the cooling of at least a portion of the heat-affected zone formed around the fusion zone commences right after reaching the maximum temperature.

The standard data may also include predetermined locations of the spray nozzles, predetermined spray pressure, and predetermined temperature and flow rate of the low-temperature fluid.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Embodiments of the present invention will now be described more fully with reference to the accompanying drawings.

Figure 1:
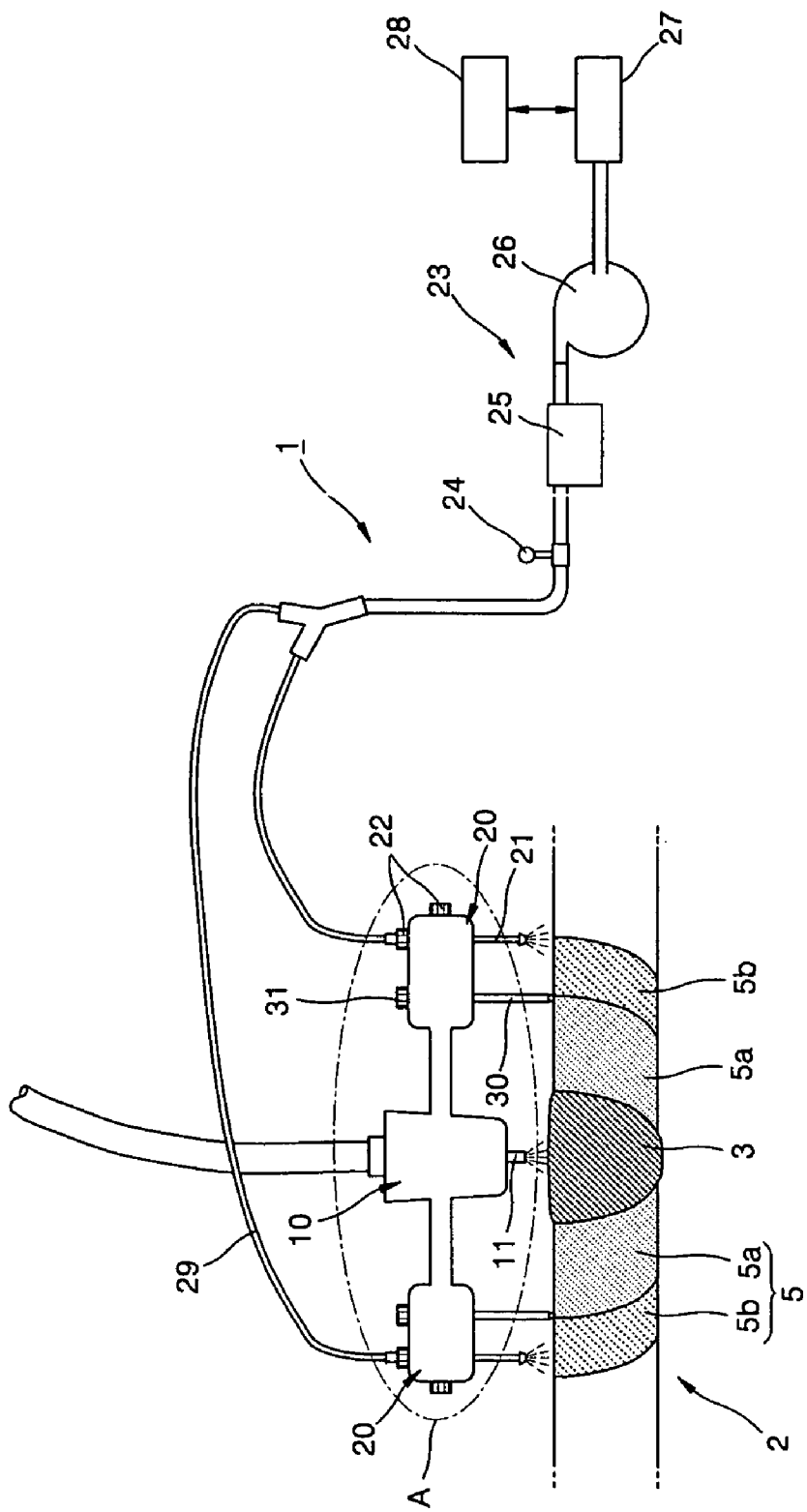
FIG. 1 is a schematic drawing of a local heatsink welding device according to an embodiment of the present invention.
Figure 2:
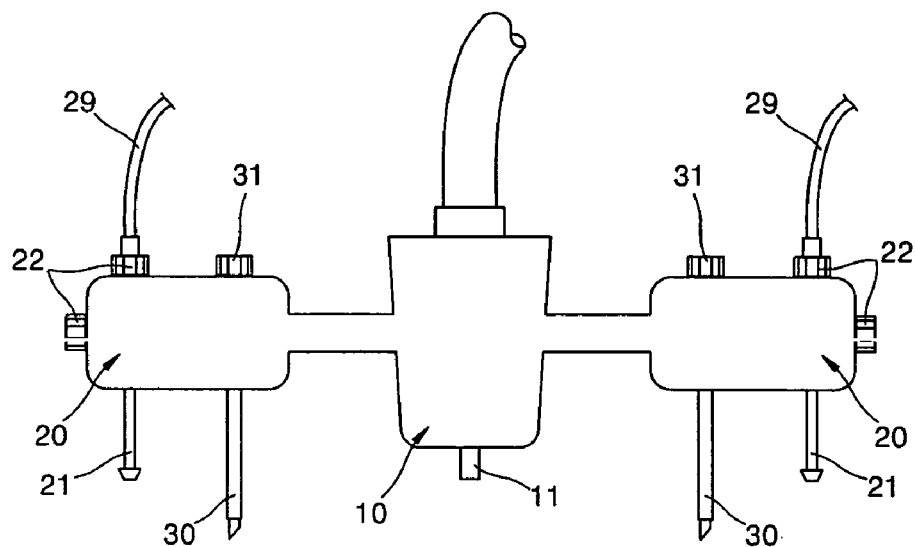
FIG. 2 is a magnified view of "A" in FIG. 1.

FIG. 1 is a schematic drawing of a local heatsink welding device according to an embodiment of the present invention, and FIG. 2 is a magnified view of "A" in FIG. 1.

Referring to FIGS. 1 and 2, a local heatsink welding device 1 comprises a welding torch 10, disposed at an upper surface of two contacting parts of a base metal to be welded together, that melts and deposits an electrode or a welding wire 11 to a base metal 2, a cooling unit 20 that is disposed to be able to spray low-temperature fluid from the side of the welding torch 10, and a shielding curtain 30 disposed between the welding torch 10 and a spray nozzle 21 of the cooling unit 20 which will be described later. The base metal 2 can be divided into a fusion zone 3 which is melted during welding, and a heat-affected zone 5, surrounding the fusion zone 3, which is affected by heat generated during welding. The heat-affected zone 5 can be subdivided into a transformation heat-affected zone 5a in which the phase of the base metal 2 transforms, and a non-transformation heat-affected zone 5b in which the phase of the base metal 2 does not transform.

An arc welding method is mainly used for welding the base metal 2, i.e., SA508 Gr. 3 steel, in the present invention. In arc welding, an intense current is formed between the welding torch 10 and the base metal 2 while a welding wire 11 is supplied to the welding torch 10, thereby instantly melting the welding wire 11 and the base metal 2 to cause fusion. Accordingly, the welding torch 10 includes the electrode or the welding wire 11 and is connected to a welder (not shown) in which an electric circuit is included.

The cooling unit 20 comprises a pair of spray nozzles 21 disposed at both sides of the welding torch 10, the spray nozzles spraying a low-temperature fluid toward the heat-affected zone 5, a fluid supply unit 23 that supplies the fluid to the spray nozzles 21, and a pair of fluid supply hoses 29 connected between the spray nozzle 21 and the fluid supply unit 23, the fluid supply hoses 29 forming the flow path through which the fluid from fluid supply unit 23 moves to the spray nozzle 21. The fluid supply unit 23 comprises a fluid storage container 27 for storing the low-temperature fluid, a temperature controller 28 for controlling the temperature of the fluid stored in the fluid storage container 27, a fluid supply pump 26 that generates power for spraying fluid stored in the fluid storage container 27 through the spray nozzles 21, a fluid flow-rate/pressure controller 25 that controls a flow rate and pressure of fluid flowing through the fluid supply hoses 29, and a flow meter 24 that indicates the flow rate. In this structure, the fluid, whose temperature and flow-rate/pressure are controlled by the temperature controller 28 and the fluid flow-rate/pressure controller 25, is supplied from the fluid storage container 27 to the fluid supply hoses 29 at a predetermined low temperature when the fluid supply pump 26 operates. The low-temperature fluid supplied to the fluid supply hoses 29 is sprayed through the spray nozzles 21 onto the non-transformation heat-affected zone 5b of the base material 2, thus cooling the non-transformation heat-affected zone 5b.

The pair of spraying nozzles 21 disposed at both sides of the welding torch 10 in the present invention moves along with the welding torch 10. However, after positioning the welding torch 10, the position of the spray nozzles 21 can be adjusted up/down and left/right with respect to the base metal 2 by a spray nozzle control device 22, thereby enabling the spray nozzles 21 to be positioned to effectively suppress the formation of carbide coarsening in the non-transformation heat-affected zone 5b.

A shielding curtain 30 is mounted to be capable of moving between the welding torch 10 and the spray nozzles 21 under the control of a shielding curtain location control device 31 disposed between the spray nozzles 21 and the welding torch 10. The shielding curtain 30 is disposed at an appropriate location between the spray nozzles 21 and the welding torch 10 to prevent the low-temperature fluid from being spayed or deflected onto the fusion zone 3, and from flowing to the fusion zone 3 from the non-transformation heat-affected zone 5b. Accordingly, the shielding curtain 30 prevents the low-temperature fluid from affecting the welding process.

Figure 3:
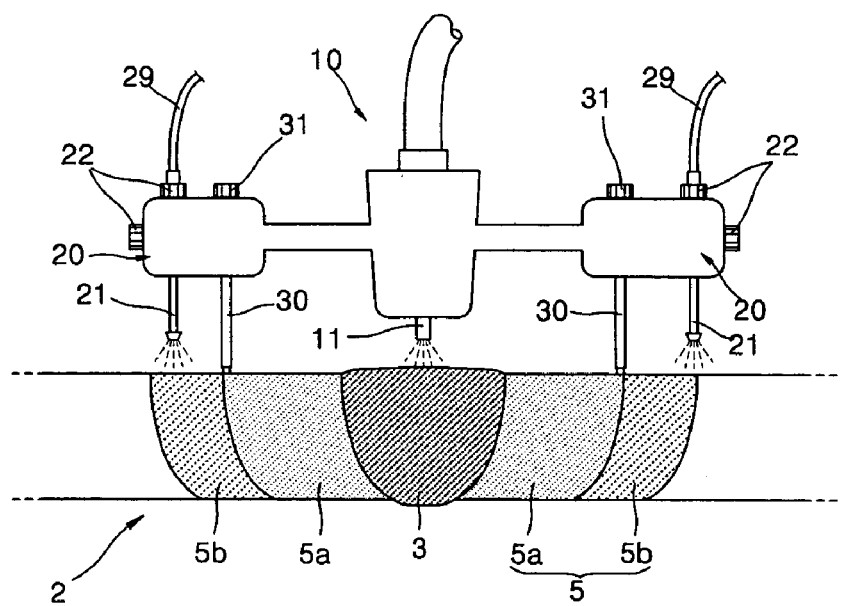
FIG. 3 is a schematic drawing illustrating a method of welding using a local heatsink welding device according to the embodiment of the present invention.
Figure 4:
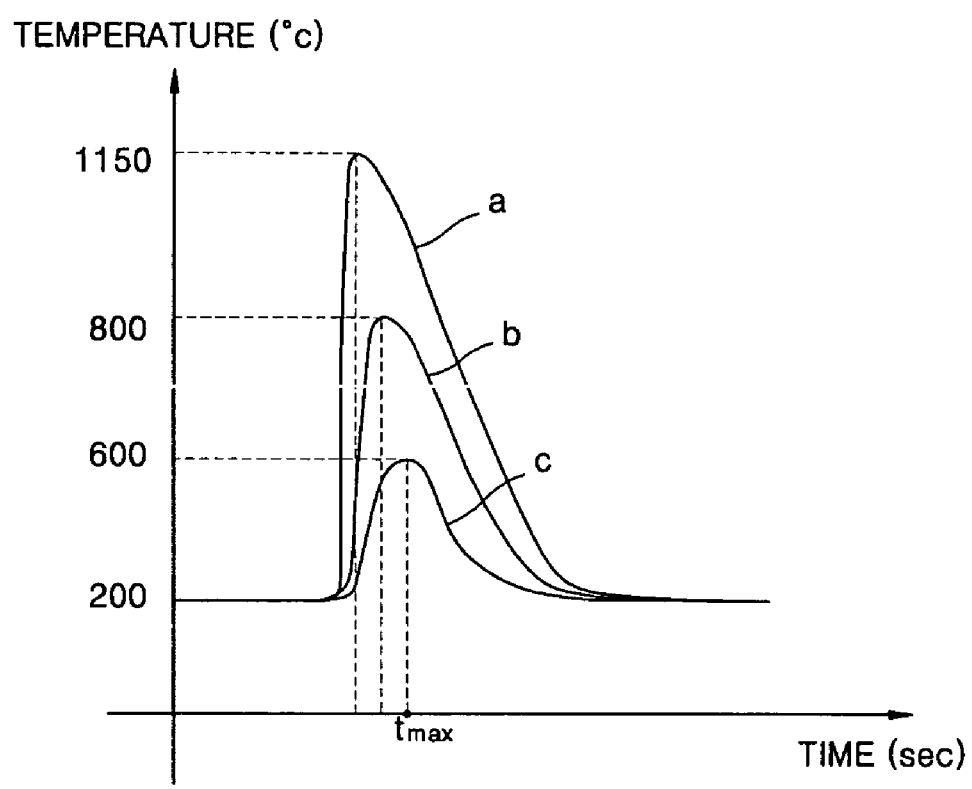
FIG. 4 is a graph for explaining a time taken to reach the maximum temperature of a heat-affected zone.

A method of welding according to the present invention, using the welding device described above, will now be described with reference to FIGS. 3 and 4.

Before commencing welding, a local brittle zone of the base metal 2 where the mechanical properties of the base metal 2 are reduced as a result of welding is determined through existing research results, experiments, and analytical research regarding the base metal, i.e., the welds of SA508 Gr. 3 steel in the present invention.

Presently, the non-transformation heat-affected zone 5b is reported as the weakest point at which the mechanical properties are degraded after welding. Then, a time required to reach a maximum temperature of the non-transformation heat-affected zone 5b of the base metal 2 is determined through an analytical method such as a finite element method, and a temperature measuring experiment using a thermocouple. FIG. 4 is a graph for explaining the time taken to reach the maximum temperature of the non-transformation heat-affected zone 5b, and graphs a, b, and c, represent temperature variation of the base metal 2 at distances of 2, 4, and 6 mm from a fusion line, respectively. Points a and b are in the transformation heat-affected zone 5a and point c is in the non-transformation heat-affected zone 5b. The time required to reach the maximum temperature should vary a little bit since heat input drops with distance from the fusion line. However, since the non-transformation heat-affected zone 5b is farther from the fusion line than the transformation heat-affected zone 5a, local cooling of the base metal 2 based on the time $t_{max}$ taken to reach the maximum temperature of the non-transformation heat-affected zone 5b may result in less variation in the microstructure and size of the transformation heat-affected zone 5a. Here, $t_{max}$ is stored as the standard time t to reach the maximum temperature of the non-transformation heat-affected zone 5b. Also, the optimum location of the spray nozzles 21, optimum spray pressure, optimum fluid temperature, and optimum flow rate, for preventing deterioration of the mechanical properties of the non-transformation heat-affected zone 5b, can be determined by analytical methods using a finite element analysis and experiments.

Next, after placing two predetermined parts of base metal 2 in contact in order to weld them together, the two parts of base metal 2 are fusion-welded by melting the welding wire 11 and the two parts and letting them fuse together.

During welding, when the temperature of the non-transformation heat-affected zone 5b reaches the maximum temperature according to the standard data stored in advance, then at least a region of the non-transformation heat-affected zone 5b is cooled by spraying the low-temperature fluid through the spray nozzles 21 onto the non-transformation heat-affected zone 5b formed outside of the fusion zone 3 by operating the fluid supply pump 26.

As described above, by using the local heatsink welding device 1 to cool the non-transformation heat-affected zone 5b by spraying a low-temperature fluid onto at least a region of the non-transformation heat-affected zone 5b right after reaching the pre-stored maximum temperature $t_{max}$, formation of carbide coarsening on the non-transformation heat-affected zone 5b during welding can be suppressed. Thus, mechanical properties, such as mechanical strength and fracture toughness, of a pressure vessel for a power plant can be improved without adding a new heat treatment process in the manufacture of steel for the pressure vessel. Here, the local heatsink welding device 1 includes the welding torch 10 that fusion-welds the base metal 2 by melting the welding wire 11 on the upper surface of the contacting parts of the base metal 2, and the cooling unit 20 that is disposed at a location capable of spraying the low-temperature fluid from both sides of the welding torch 10 to cool the non-transformation heat-affected zone 5b formed outside of the fusion zone 3 in which the base metal 2 is molten.

In the above description, the spray nozzles 21 are disposed at both sides of the welding torch 10. Here, the spray nozzles 21 can be connected to the welding torch 10 or disposed independently from the welding torch 10 above the surface of the non-transformation heat-affected zone 5b of the base metal 2, so long as they are able to spray the low-temperature fluid onto the non-transformation heat-affected zone 5b.

Also, in the above description, it is assumed that the base metal 2 is SA508 Gr. 3. However, the present invention can be applied to any metallic base metal 2, when it is necessary to suppress the formation of carbide coarsening on the non-transformation heat-affected zone 5b during welding.

Moreover, in the above description, the local brittle zone is the non-transformation heat-affected zone 5b. But, if the local brittle zone is the transformation heat-affected zone 5a, the transformation heat-affected zone 5a can also be cooled.

As described above, a local heatsink welding device and a method of welding according to the present invention can improve mechanical properties, such as mechanical strength and fracture toughness of welds such as a pressure vessel for a power plant by suppressing the formation of carbide coarsening on a non-transformation heat-affected zone during a welding process, without adding a new heat treatment process in the production of steel for the pressure vessel.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A local heatsink welding device for improving mechanical properties of welds of a base metal, comprising:
   a welding torch disposed above welds of two pieces of the base metal placed in contact with each other to be welded, the welding torch welding the pieces of the base metal by melting a welding wire or an electrode on the welds of the base metal and fusing the pieces together; and
   a cooling unit disposed to be able to spray a low-temperature fluid from the sides of the welding torch, the cooling unit cooling at least a portion of a non-transformation heat-affected zone formed around the outside of a fusion zone in which the base metal is molten during welding;
   wherein the cooling unit comprises a pair of spray nozzles disposed at both sides of the welding torch to be able to move up and down, the nozzles spraying the low-temperature fluid onto the heat-affected zone, a fluid supply unit that supplies the low-temperature fluid to the spray nozzles, a pair of fluid supply hoses connected between the spray nozzles and the fluid supply unit, the fluid supply hoses forming the flow path through which the fluid from the fluid supply unit moves to the spray nozzles, and a spray nozzle control device controlling locations of the spray nozzles up and down and left and right with respect to the base metal; and
   wherein a shielding curtain is disposed between each of the spray nozzles and the welding torch to prevent the low-temperature fluid discharged from the spray nozzle from flowing to the fusion zone from the heat-affected zone.

2. A method of welding using a local heatsink welding device for improving mechanical properties of welds of a base metal which is a quenched and tempered vacuum-treated forged low alloy steel for a pressure vessel, comprising;
   determining the border line between a transformation heat-affected zone and a non-transformation heat-affected zone which are generated due to the heat supplied to the low alloy steel during welding, according to analytical and/or experimental methods;
   positioning two pieces of the low alloy steel base metal in contact with each other to be able to be welded;
   welding the two pieces of low alloy steel base metals together by melting an electrode or a welding wire on a welds of the base metal and fusing the pieces together; and cooling at least a portion of the non-transformation heat-affected zone formed around a fusion zone in which the low alloy steel base metal is molten, during welding, based on predetermined standard data regarding the welding of the low alloy steel base metal.

3. The method of claim 2, wherein the standard data includes a time taken to reach a maximum temperature of the non-transformation heat-affected zone, and the cooling of at least a portion of the non-transformation heat-affected zone formed around the fusion zone commences right after reaching the maximum temperature.

4. The method of claim 2, wherein the standard data regarding welding includes predetermined locations of the spray nozzles, predetermined spray pressure, and predetermined temperature and flow rate of the low-temperature fluid.

5. A local heatsink welding device for improving mechanical properties of welds of a base metal, comprising:

a welding torch disposed above welds of two pieces of the base metal placed in contact with each other to be welded, the welding torch welding the pieces of the base metal by melting a welding wire or an electrode on the welds of the base metal and fusing the pieces together; and a cooling unit disposed to be able to spray a low-temperature fluid from the sides of the welding torch, the cooling unit cooling at least a portion of a non-transformation heat-affected zone formed around the outside of a fusion zone in which the base metal is molten during welding;

wherein the cooling unit comprises a pair of spray nozzles disposed at both sides of the welding torch to be able to move up and down, the nozzles spraying the low-temperature fluid onto the heat-affected zone, a fluid supply unit that supplies the low-temperature fluid to the spray nozzles, and a pair of fluid supply hoses connected between the spray nozzles and the fluid supply unit, the fluid supply hoses forming the flow path through which the fluid from the fluid supply unit moves to the spray nozzles; and wherein a shielding curtain is disposed between each of the spray nozzles and the welding torch to prevent the low-temperature fluid discharged from the spray nozzle from flowing to the fusion zone from the heat-affected zone.

* * * * *